United States Patent
Oyama et al.

(10) Patent No.: US 7,513,647 B2
(45) Date of Patent: Apr. 7, 2009

(54) LIGHT SOURCE DEVICE AND OPTICAL SCANNING APPARATUS PROVIDED WITH SUCH LIGHT SOURCE DEVICE

(75) Inventors: Hiroki Oyama, Hioki (JP); Masato Ohnishi, Osaka (JP)

(73) Assignee: Kyocera Mita Corporation (JP)

( * ) Notice: Subject to any disclaimer, the term of this patent is extended or adjusted under 35 U.S.C. 154(b) by 235 days.

(21) Appl. No.: 11/504,511

(22) Filed: Aug. 15, 2006

(65) Prior Publication Data
US 2007/0091407 A1 Apr. 26, 2007

(30) Foreign Application Priority Data
Aug. 18, 2005 (JP) .............................. 2005-237272

(51) Int. Cl.
*F21V 17/04* (2006.01)
(52) U.S. Cl. ..................................................... 362/259
(58) Field of Classification Search ................. 362/191, 362/259
See application file for complete search history.

(56) References Cited

U.S. PATENT DOCUMENTS
6,543,907 B2 * 4/2003 Nishiyama et al. .......... 362/259
6,733,153 B1 * 5/2004 Lee ............................. 362/191

FOREIGN PATENT DOCUMENTS
JP 2002-162591 6/2002
JP 2002-350760 12/2002
JP 2003-29180 1/2003

* cited by examiner

*Primary Examiner*—Sandra O'Shea
*Assistant Examiner*—James W Cranson
(74) *Attorney, Agent, or Firm*—Gerald E. Hespos; Anthony J. Casella (57) ABSTRACT

A light source device is provided with a laser diode for emitting a light beam, and a base member obtained by integrally forming a flat portion and a standing portion projecting in a direction perpendicular to the flat portion and to have the laser diode mounted therein. The flat portion is formed with one or more screw holes for fixing the base member to a specified installation surface by means of screw(s), and through hole(s) penetrating the flat portion between the standing portion and the screw hole(s) formed near the standing portion.

18 Claims, 12 Drawing Sheets

LIGHT SOURCE DEVICE AND OPTICAL SCANNING APPARATUS PROVIDED WITH SUCH LIGHT SOURCE DEVICE

BACKGROUND OF THE INVENTION

1. Field of the Invention

The present invention relates to a light source device employing a laser diode and used as a writing light source in an image forming apparatus, for example, as exemplified by a printer, a facsimile machine or a copier, and an optical scanning apparatus provided with such a light source device.

2. Description of the Related Art

There has been conventionally used an optical scanning apparatus for illuminating a photoconductive element with a laser beam outputted from a laser emitting portion to form an electrostatic latent image. Generally, the optical scanning apparatus is constructed such that a beam light emitted from a beam light source device having a laser diode (hereinafter, referred to as an "LD") is focused as a beam spot on a surface to be scanned by way of scanning optical members including a cylindrical lens, a polygon mirror, and a scanning lens. Scanning of the beam spot at the same speed on the surface to be scanned in a main scanning direction is realized through the rotation of the polygon mirror. A multi-beam scanning apparatus provided with a plurality of LDs can more quickly scan a surface and form an electrostatic latent image without increasing the number of revolutions of the polygon mirror as compared to a case where scanning is performed using one beam light. Thus, such a multi-beam scanning apparatus is widely applicable to an image forming apparatus as exemplified by a copier, a laser printer or a laser facsimile machine.

In such an optical scanning apparatus, an interval adjustment of beam spots formed on a surface to be scanned largely depends on a precision adjustment of an optical-axis alignment of a light source device, the precision of a beam splitter surface and the angular precision of a reflecting surface. Depending on the material and shape thereof or a difference in thermal expansion coefficient between the base member and a housing of the optical scanning apparatus, however, a base member on which the light source device is to be mounted and an adjustment member for beam spots are deformed by heat produced from the LDs themselves and an APC (automatic power control) board for performing a modulation control of the LDs, or when an ambient temperature largely changes. As these members are deformed, an installed angle of the base member varies from a desired angle, thereby causing a problem of displacing an array of beam spots in a sub-scanning direction.

In view of this problem, various methods have been proposed to prevent an array displacement of beam spots in the sub-scanning direction. Japanese Unexamined Patent Publication No. 2002-162591 discloses a method according to which an LD control plate for performing a modulation control of an LD in accordance with an image data is exposed to the outside of an optical scanning apparatus, thereby preventing a thermal deformation of a base member caused by heat from the LD control plate. However, according to this embodiment, an exposure space for the LD control plate is necessary because the LD control plate is exposed to the outside of the apparatus to radiate heat outside, which is disadvantageous to the miniaturization and higher density of an image forming apparatus. Further, since it is necessary to seal the apparatus by employing a labyrinth structure or the like, the construction of the housing becomes complicated. In the case of a multi-beam optical scanning apparatus using a plurality of LDs, process precision and mass productivity are reduced, leading to a cost increase.

Japanese Unexamined Patent Publication No. 2003-29180 discloses a method according to which a restricting means for restricting an angle of inclination of a light source unit with respect to a sub-scanning direction is movably provided so that a change in the inclination of the light source unit resulting from a temperature change can be adjusted. This method necessitates the restricting member in addition to a base member, thereby increasing the number of parts and increasing adjustment steps because of a more complicated construction. Further, a nonlinear element is added to make the construction instable since an elastic member is disposed between the base member and the restricting member.

Further, Japanese Unexamined Patent Publication No. 2002-350760 discloses a method according to which, in an optical scanning apparatus including a first optical system for coupling luminous fluxes from a light source, a second optical system for focusing the coupled luminous fluxes as a line image on a plane of polarization and a third optical system for gathering the focused beam light as a spot on a surface to be scanned, temperature-distribution creating means is provided to make a change in ambient temperature near the third optical system smaller than those near the first and second optical systems. According to this embodiment, the temperature-distribution creating means such as an air-cooling fan needs to be separately provided, which causes the enlargement and higher cost of the optical scanning apparatus.

SUMMARY OF THE INVENTION

An object of the present invention is to provide a light source device capable of preventing relative displacements of a LD and optical members and an array displacement of beam spots by suppressing the thermal deformation of a base member caused by a thermal expansion, and an optical scanning apparatus having such a light source device.

In order to accomplish the above object, one aspect of the present invention is directed to a light source device, comprising a laser diode for emitting a light beam, and a base member obtained by integrally forming a flat portion and a standing portion projecting in a direction perpendicular to the flat portion and to have the laser diode mounted therein. In such a construction, the flat portion is formed with one or more screw holes for fixing the base member to a specified installation surface by means of screw(s), and through hole(s) penetrating the flat portion between the standing portion and the screw hole(s) formed near the standing portion.

Alternatively, the standing portion is formed with one or more screw holes for fixing the base member to a specified installation surface by means of screw(s), and through hole(s) penetrating the standing portion between the flat portion and the screw hole(s) formed near the flat portion.

Another aspect of the present invention is directed to an optical scanning apparatus, comprising a light source device for generating a light beam, and a scanning optical member for focusing the light beam on a specified surface to be scanned and causing the light beam to scan.

In such a construction, either one of the above light source devices is employed as the light source device.

DETAILED DESCRIPTION OF THE PREFERRED EMBODIMENTS

Figure 1:
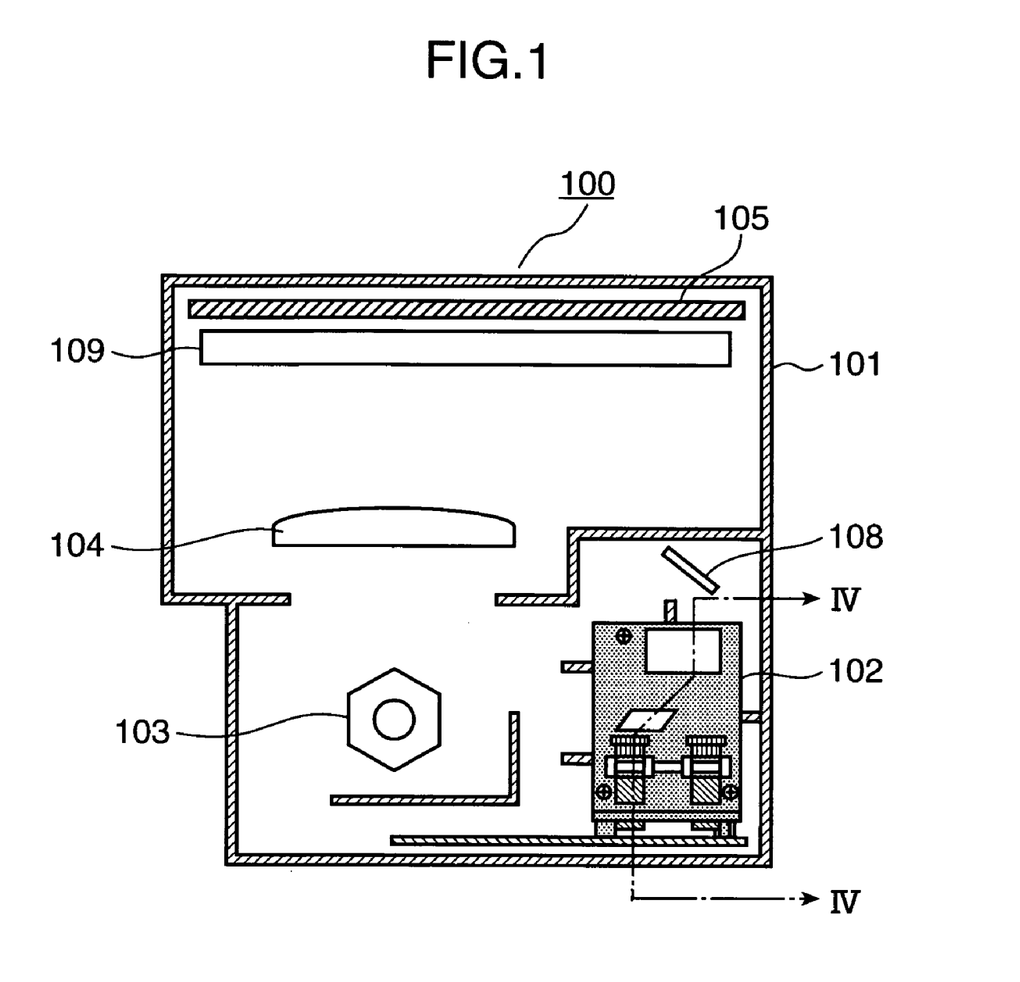
FIG. 1 is a schematic plan view showing the construction of an optical scanning apparatus according to one embodiment of the invention.

FIG. 1 is a schematic plan view showing the construction of an optical scanning apparatus 100 according to one embodiment of the present invention.

This optical scanning apparatus 100 includes a housing 101, a light source device 102 having two LDs arranged in the housing 101, a polygon mirror 103, a scanning lens 104 and a reflecting mirror 105.

Two beam lights emitted from the light source device 102 are incident on the polygon mirror 103 via later-described optical members arranged on the light source device 102 and a plane mirror 108. The beam lights polarized by a polarizing surface of the polygon mirror 103 are focused on a surface to be scanned (not shown) by way of the scanning lens 104 having a fθ characteristic and the reflecting mirror 105. A window 109 is formed in the bottom surface of the housing 101 to introduce the beam lights toward the surface to be scanned. Further, an upper part of the optical scanning apparatus 100 is closed by an unillustrated lid member.

Figure 2:
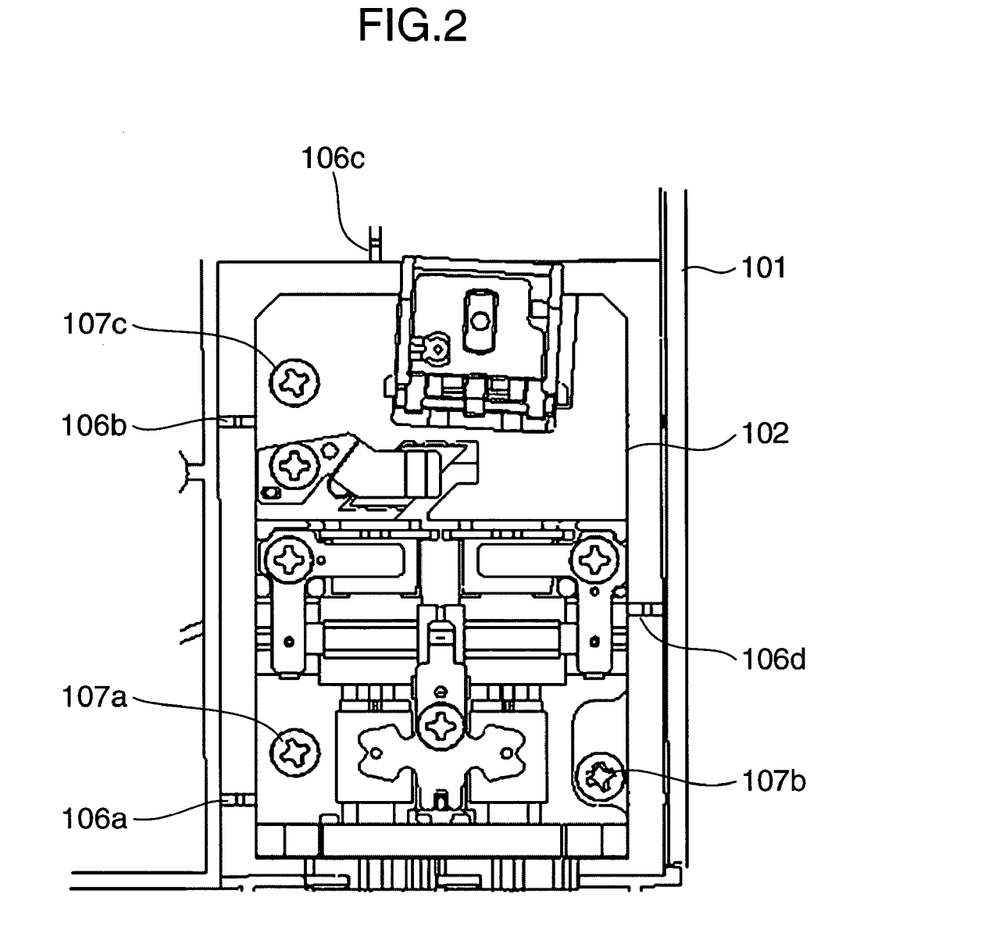
FIG. 2 is a plan view showing the external construction of a light source device to which the invention is applied.

FIG. 2 is an enlarged view showing a part of FIG. 1 near the light source device 102. As shown in FIG. 2, the light source device 102 is aligned with and placed on positioning projections 106a, 106b, 106c and 106d provided on the inner bottom surface of the housing 101, and fixed to the housing 101 by means of screws 107a, 107b, 107c.

Figure 3:
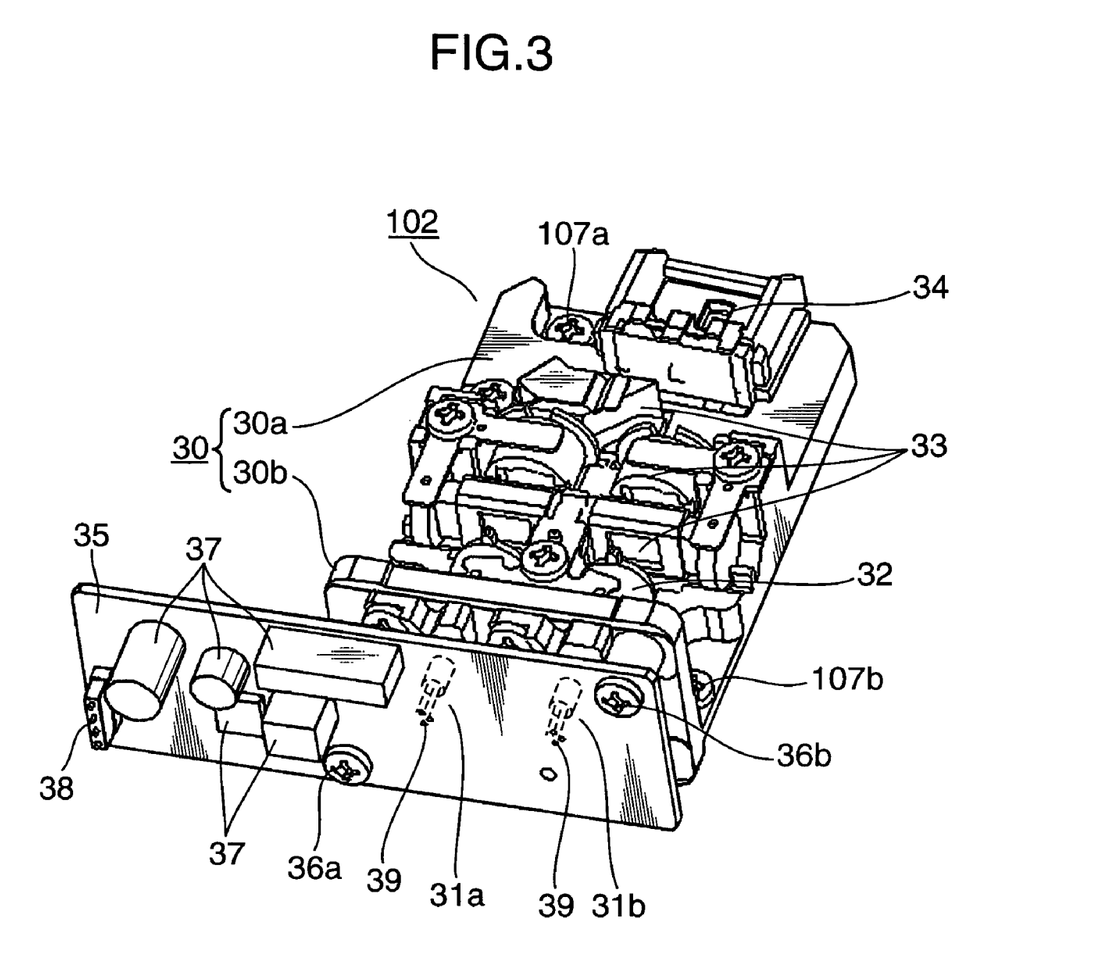
FIG. 3 is a perspective view showing the external construction of the light source device to which the invention is applied.

FIG. 3 is a perspective view showing the external construction of the light source device 102. The light source device 102 is such that the LDs and the respective optical members are arranged on a base member 30. The use of the base member 30 having a smaller thermal expansion coefficient can suppress relative displacements of the optical members caused by the thermal expansion of the housing 101 and also suppress a displacement of the beam spot on the surface to be scanned as compared to a method according to which the LDs and the optical members are directly arranged on the housing 101 of the optical scanning apparatus 100. The base member 30 is provided with a flat portion 30a to be horizontally fixed to the housing 101 of the optical scanning apparatus 100, and a standing portion 30b projecting upward from one end of the flat portion 30a. The flat portion 30a and the standing portion 30b are so integrally formed as to be substantially L-shaped in side view.

Two LDs 31a, 31b are mounted in the standing portion 30b. A plurality of optical members to be disposed on light paths between the LDs 31a, 31b and the polygon mirror 103 are arranged on the flat portion 30a. These optical members are a collimator lens 32 for collimating beam lights emitted from the LDs 31a, 31b into substantially parallel beams, optical-path changing means 33 including a flat optical element, a lens and a prism, and a cylindrical lens 34 having a refractive power only in a sub-scanning direction, these members 32 to 34 being arranged in this order from the side of the standing portion 30b. These optical members are respectively fixed on the flat portion 30a by means of fittings or screws.

The respective beam lights having passed the cylindrical lens 34 are polarized by the polygon mirror 103 (see FIG. 1) after being reflected by the plane mirror 108 (see FIG. 1), and form beam spots on the surface to be scanned via the scanning lens 104 (see FIG. 1). These beam spots perform recording of, for example, image information.

The flat portion 30a is fixed to the inner bottom surface of the housing 101 (see FIG. 1) by means of the screws 107a, 107b, 107c (see FIG. 2) at two positions near the standing portion 30b and at one position at the opposite side. Since the base member 30 is securely fixed to the optical scanning apparatus 100 in this way, the LDs 31a, 31b and the respective optical members 32 to 34 on the base member 30 are prevented from displacements caused by external forces, vibration and the like.

An automatic power control board (hereinafter, referred to as an "APC board") 35 for performing a modulation control of the LDs 31a, 31b in accordance with an image data is fixed to the rear surface of the standing portion 30b by means of screws 36a, 36b. Electronic components 37 such as transistors and capacitors and a connector 38 used for the connection with a power supply circuit are arranged on the APC board 35. Further, the APC board 35 is formed with pinholes 39 into which lead pins of the LDs 31a, 31b are inserted.

Figure 4:
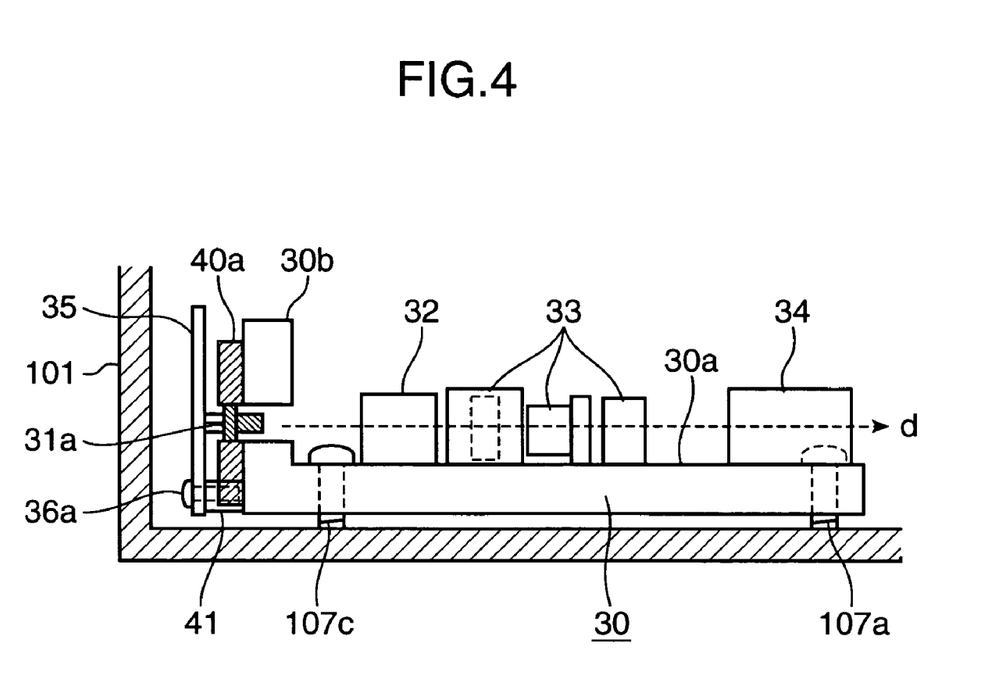
FIG. 4 is a section along IV-IV of FIG. 1.

FIG. 4 is a section (along IV-IV of FIG. 1) showing a state where a light source device is installed in an optical scanning apparatus. Parts common to those in FIGS. 1 to 3 are identified by the same reference numerals and are not described. As shown in FIG. 4, a holding member 40 a through which the LD 31a is inserted is mounted on the standing portion 30b. Through a screw hole formed in the APC board 35, a screw 36a is fastened to a boss 41 provided on the standing portion 30b. The arrangement of the collimator lens 32, the optical-path changing means 33, and the cylindrical lens 34 is adjusted such that a beam light "d" emitted from the LD 31a is incident on the plane mirror 108 after passing the cylindrical lens 34. Although not described here, a construction for the LD 31b is completely identical.

In the light source device 102 described above, relative displacements of the LDs 31a, 31b and the optical members and an array displacement of the beam spots are prevented by suppressing the thermal deformation of the base member 30 caused by thermal expansion. Embodiments of such a base member 30 are described below.

Figure 5:
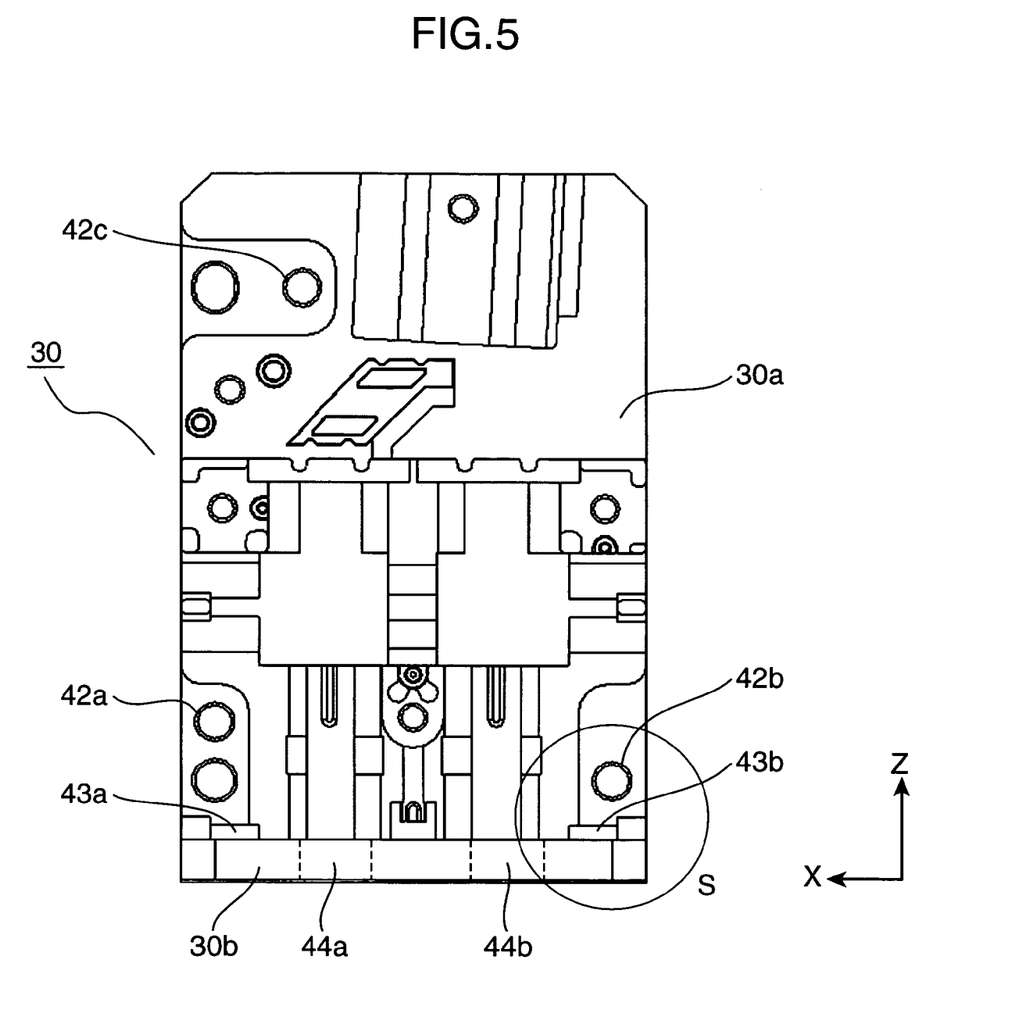
FIG. 5 is a plan view showing a base member used in the light source device according to a first embodiment of the invention.
Figure 6:
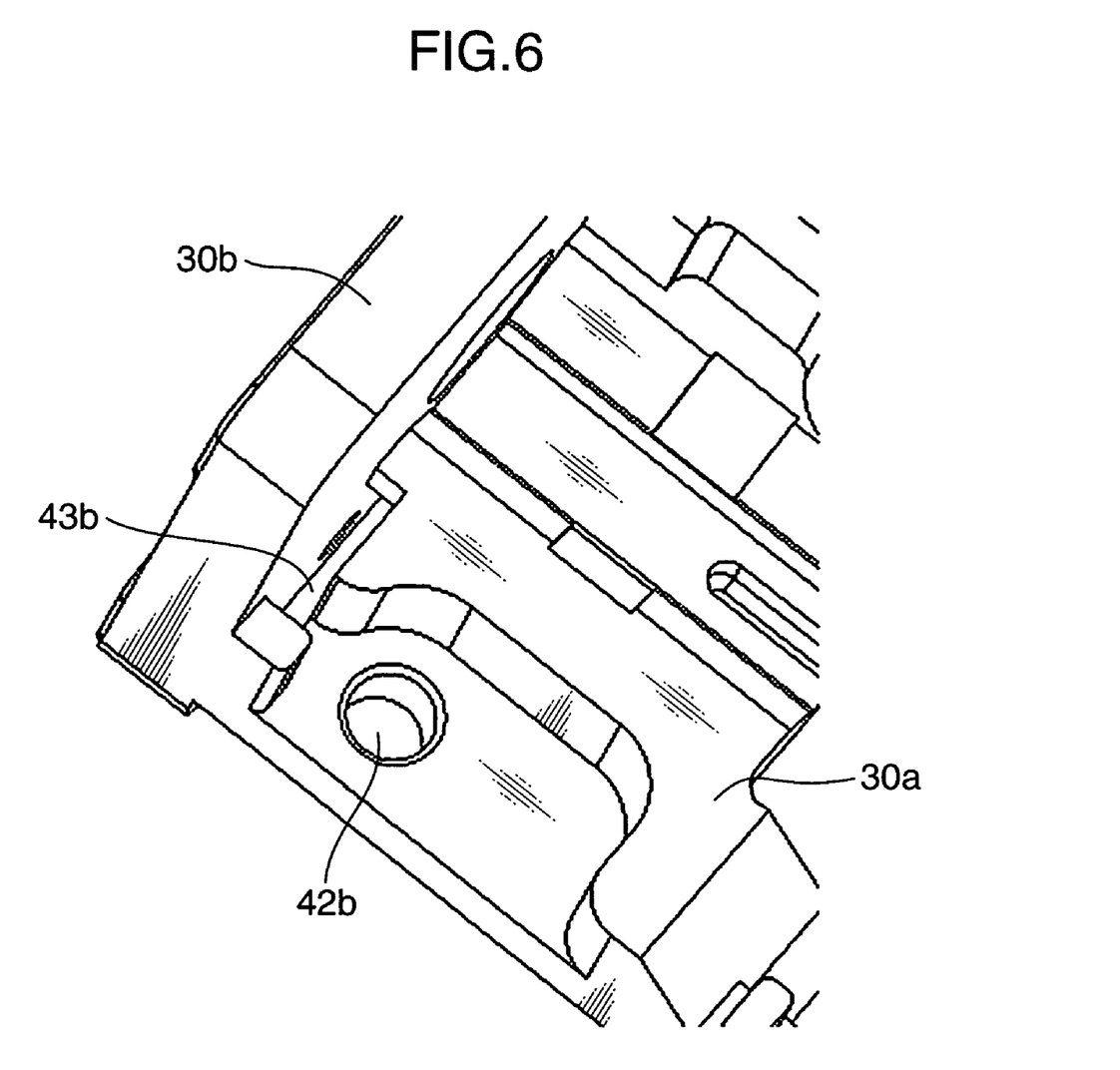
FIG. 6 is an enlarged perspective view showing a part of FIG. 5 near a through hole.

FIG. 5 is a plan view of the base member 30 according to a first embodiment of the present invention, and FIG. 6 is an enlarged perspective view within a circle S shown in FIG. 5. This base member 30 is obtained by integrally forming a flat portion 30a in the form of a rectangular flat plate and a standing portion 30b projecting from one shorter edge side of the flat portion 30a in a direction perpendicular to the flat portion 30a. The flat portion 30a is formed with a surface pattern in conformity with the arrangement of optical members such as the collimator lens 32, the optical-path changing means 33 and the cylindrical lens 34 shown in FIG. 3. The flat portion 30a is also formed with screw holes 42a, 42b, 42c used to fix the base member 30 to the inner bottom surface (installation surface) of the housing 101 (see FIG. 1) of the optical scanning apparatus 100 by means of screws. The screw holes are formed at three positions, wherein the screw holes 42a, 42b are arranged at two positions near the standing portion 30b and the screw hole 42c is arranged at one position at the opposite side.

In the base member 30 according to the first embodiment, two through holes 43a, 43b are formed in the flat portion 30a between the standing portion 30b and the two screw holes 42a, 42b near the standing portion 30b. These through holes 43a, 43b extend along the standing portion 30b. More specifically, the through holes 43a, 43b are so formed in the flat portion 30a as to partly abut on a line (boundary line between the standing portion 30b and the flat portion 30 a) where the standing portion 30b stands up from the flat portion 30a.

The base member 30 is fixed to the installation surface at the screw holes 42a to 42c, wherein portions between the standing portion 30b and the screw holes 42a, 42b near the standing portion 30b are divided with respect to the longitudinal direction (Z-axis direction in FIG. 5) of the flat portion 30a by the through holes 43a, 43b. Accordingly, even if the flat portion 30a longitudinally expands and is convexly curved by heat, the influence on the angle of inclination of the standing portion 30b can be alleviated. In order to achieve such a function, the through holes 43a, 43b are so dimensioned as to substantially suppress the transmission of a strain caused by the thermal expansion of the flat portion 30a to the standing portion 30b.

Figure 7:
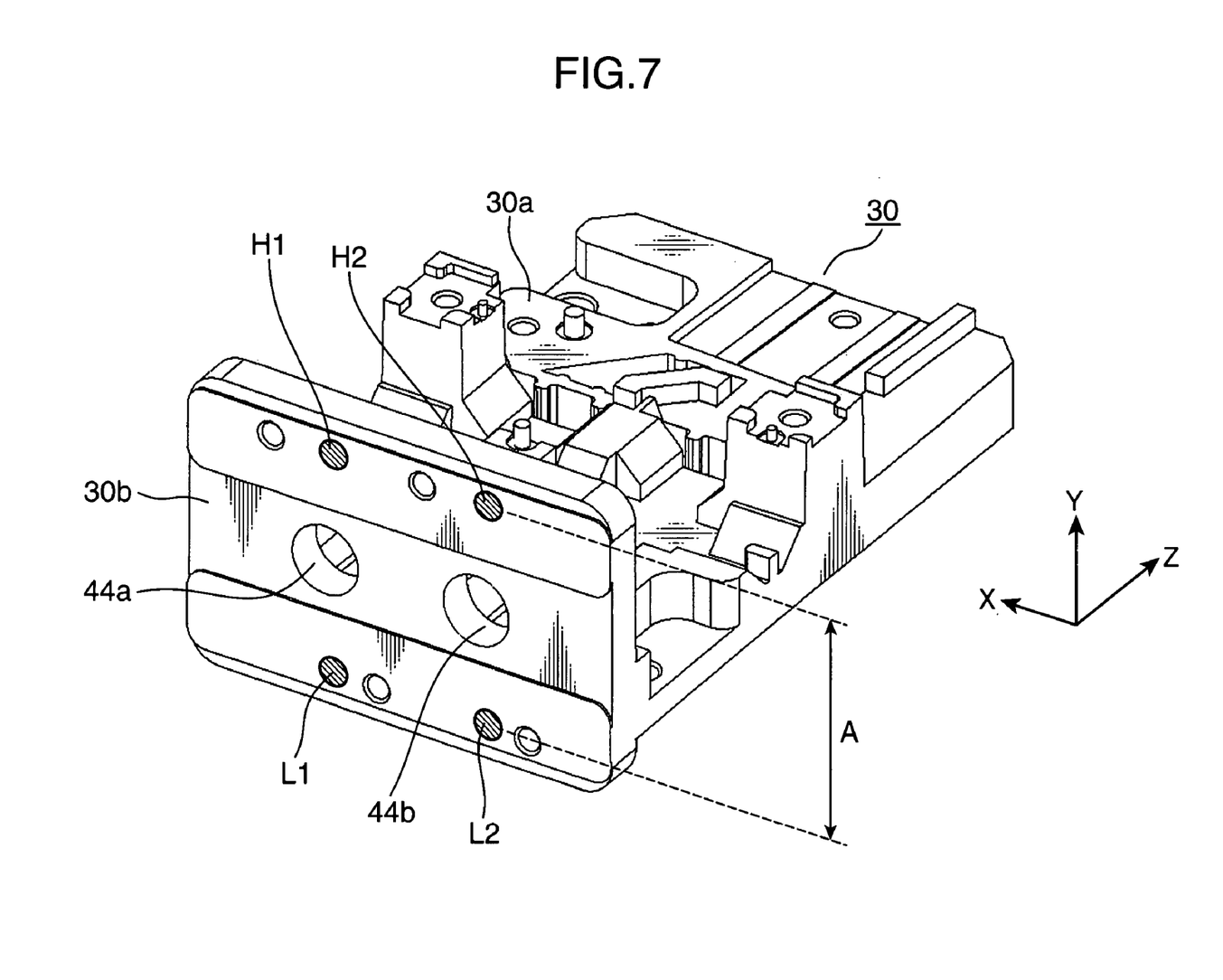
FIG. 7 is a perspective view showing the base member used in the light source device according to the first embodiment.
Figure 8:
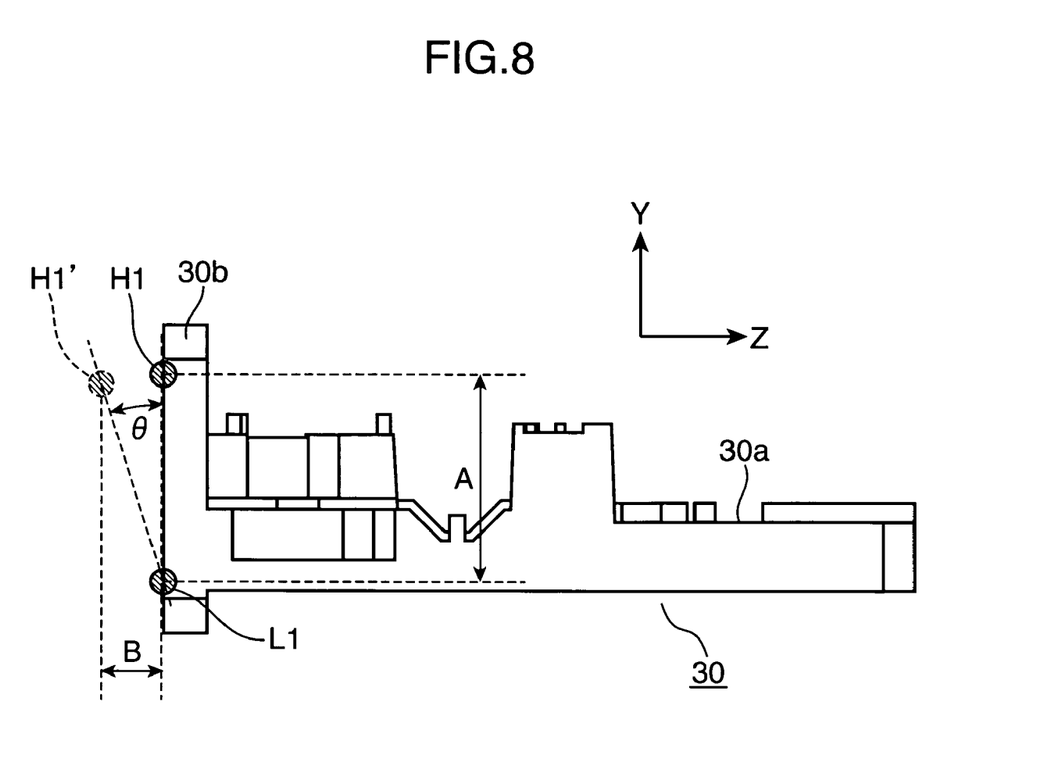
FIG. 8 is a side view showing the base member used in the light source device according to the first embodiment.

Next, a method of calculating the angle of inclination is described with reference to FIGS. 7 and 8. FIG. 7 is a perspective view of the base member 30 when viewed from a side of the standing portion 30b, and FIG. 8 is a side view of the base member 30 when viewed from the right side of FIG. 7. For example, in the case of calculating an angle of inclination of a portion around a mount hole 44a in which the LD 31a (see FIG. 3) is disposed, a distance A between measurement points H1, L1 located above and below the mount hole 44a in an initial state is first measured.

Thereafter, the temperature of the base member 30 is increased to a specified temperature, the position of the measurement point H1' after a temperature increase is calculated and a distance B between the points H1' and L1 in Z-axis direction (absolute value of a Z-axis direction component) is calculated. If θ is assumed to denote an angle of inclination of the standing portion 30b at this time, θ can be expressed by θ=ArctanB/A using A and B. By calculating this angle of inclination θ, an effect of suppressing the inclination of the standing portion 30b caused by the thermal expansion of the flat portion 30a can be judged as described later.

It should be noted that the through holes 43a, 43b can be arranged at desired positions provided that they are located between the screw holes 42a, 42b and the standing portion 30b. However, if the through holes 43a, 43b are formed along the inner surface of the standing portion 30b as in this embodiment, a strain caused by the thermal expansion of the flat portion 30a is unlikely to be transmitted to the standing portion 30b, whereby the influence on the angle of inclination of standing portion 30b can be more effectively alleviated. Therefore, this arrangement is preferable.

Figure 9:
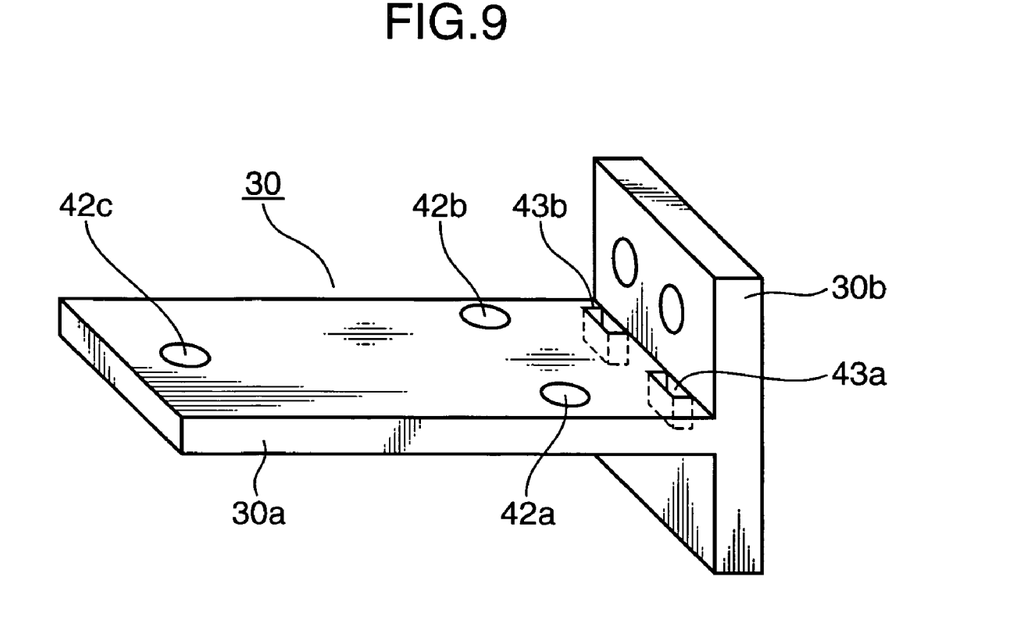
FIG. 9 is a perspective view schematically showing a differently shaped base member used in the light source device according to the present invention.
Figure 10:
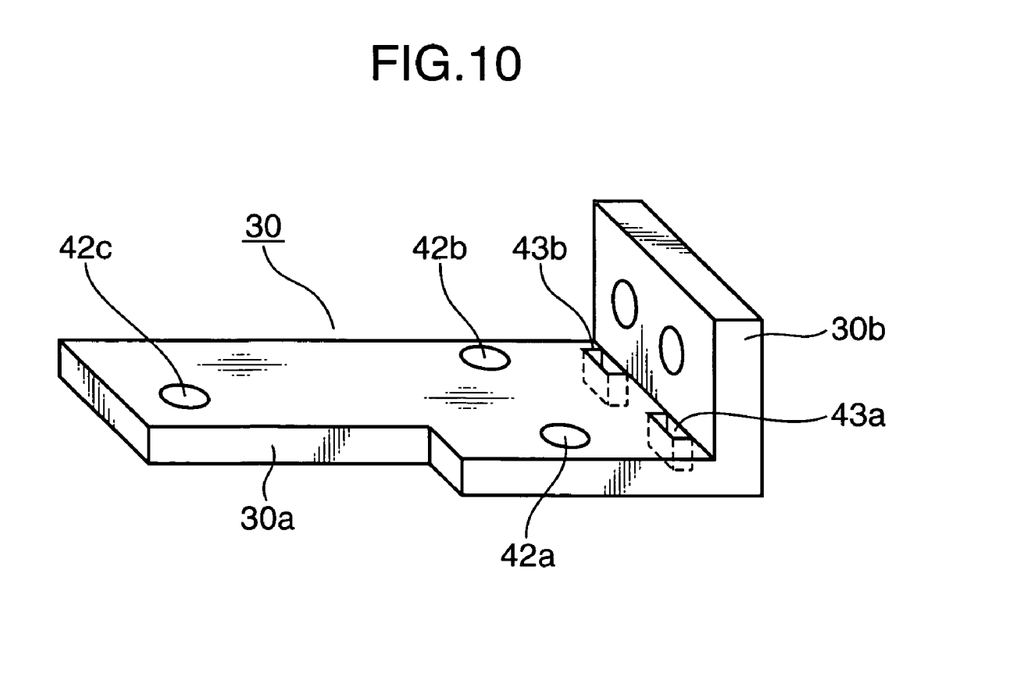
FIG. 10 is a perspective view schematically showing another differently shaped base member used in the light source device according to the present invention.

In this embodiment is used the base member 30 having an L-shaped side view by having the standing portion 30b projecting from one end of the rectangular flat portion 30a. The same effect as above can also be expected even if a base member 30 having a T-shaped side view as shown in FIG. 9 or a base member 30 having a transversely asymmetric shape as shown in FIG. 10 is used instead. There is no particular limitation on the positions and the number of the screw holes. Although a total of three screw fixing positions, two near the standing portion 30b and one at the opposite side, are provided in this embodiment, two, four or more screw fixing positions may be provided. Alternatively, the screw hole may be formed only at one position near the standing portion 30b, and a latching portion such as a hook may be provided at the opposite side instead of the screw hole.

Since the two screw holes 42a, 42b are present near the standing portion 30b in this embodiment, two through holes 43a, 43b are provided accordingly. However, the number of the through holes does not matter as long as the portions between the standing portion 30b and the screw holes near the standing portion 30b can be divided, and more through holes than the screw holes may be provided as long as the strength of the base member 30 is not reduced. The shape and size of the through holes 43a, 43b can be arbitrarily set as long as the effects of the present invention can be achieved and the strength of the base member 30 is not reduced.

Figure 11:
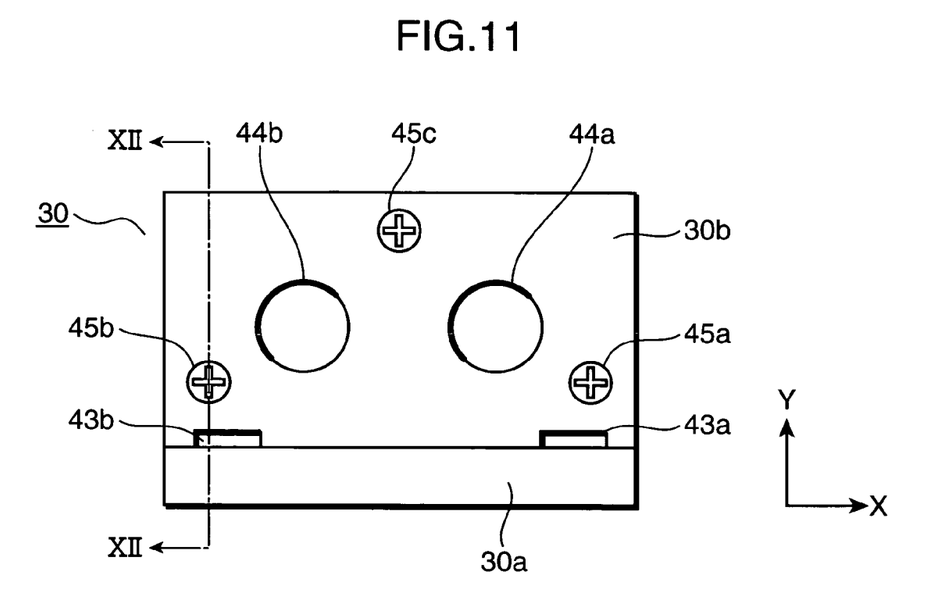
FIG. 11 is a front view showing a base member used in a multi-beam light source device according to a second embodiment of the invention.
Figure 12:
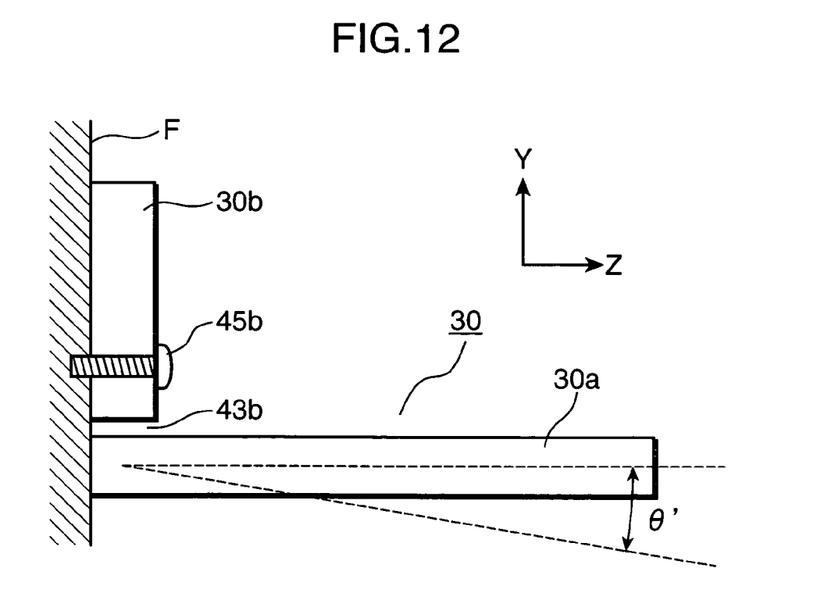
FIG. 12 is a section along XII-XII of FIG. 11.

Next, a light source device according to a second embodiment of the present invention is described with reference to FIGS. 11 and 12. FIG. 11 is a front view showing one example of a base member 30 according to the second embodiment, and FIG. 12 is a section of the base member 30 (section along XII-XII of FIG. 11). In the second embodiment, the standing portion 30b of the base member 30 is fixed to a vertical installation surface F by means of screws 45a to 45c. The other construction is not described since it is common to the first embodiment.

Since the standing portion 30b is fixed by means of screws instead of a flat portion 30a in the base member 30 of the second embodiment, through holes 43a, 43b are formed in the standing portion 30b. Specifically, they are formed along the flat portion 30 a between the flat portion 30a and screw holes (not shown) near the flat portion 30a in which screws 45a, 45 b are inserted. More specifically, the through holes 43a, 43b are so formed in the standing portion 30b as to partly abut on a line where the standing portion 30b stands up from the flat portion 30a. By such a construction, portions between the flat portion 30a and the screw holes near the flat portion 30a are divided in Y-axis direction of FIGS. 11 and 12 by the through holes 43a, 43b. Accordingly, even if the standing portion 30b thermally expands and is convexly curved, the influence on an angle of inclination θ' of the flat portion 30a can be alleviated by the same principle as in the first embodiment.

Base members having other shapes as shown in FIGS. 9 and 10 may also be used in this embodiment, and the positions and the number of the screw holes or the number, shape and size of the through holes 43a, 43b can also be arbitrarily set similar to the first embodiment.

By installing the light source device 102 of this embodiment using the base member as described above in an optical scanning apparatus, a change of an installation angle of the base member 30 from a desired angle due to the thermal deformation can be effectively suppressed. Particularly in the case of application to a multi-beam light source device in which a plurality of LDs are mounted, a problem of displacing an array of beam spots in a sub-scanning direction can be solved. Thus, all the members constituting the multi-beam light source device can be incorporated into the housing, and an optical scanning apparatus having a small size and a simple construction and necessitating no means for restricting the angle of inclination in the sub-scanning direction can be provided.

The present invention is not limited to the foregoing embodiments, and various changes can be made without departing from the scope and spirit of the present invention. For example, although the optical members such as the collimator lens 32, the optical-path changing means 33 and the cylindrical lens 34 are arranged on the flat portion 30a in the respective foregoing embodiments, it is not always necessary to mount all the optical members on the flat portion 30a. For example, only the collimator lens 32 may be arranged on the flat portion 30a while the others are directly arranged on the housing 101 of the optical scanning apparatus or all the optical members may be arranged on the housing 101. In other words, the combination, arrangement and the like of the respective optical members on the base member 30 are not limited to those in the foregoing embodiments, and can be arbitrarily selected in accordance with the specifications of the light source device and the optical scanning apparatus.

Figure 13:
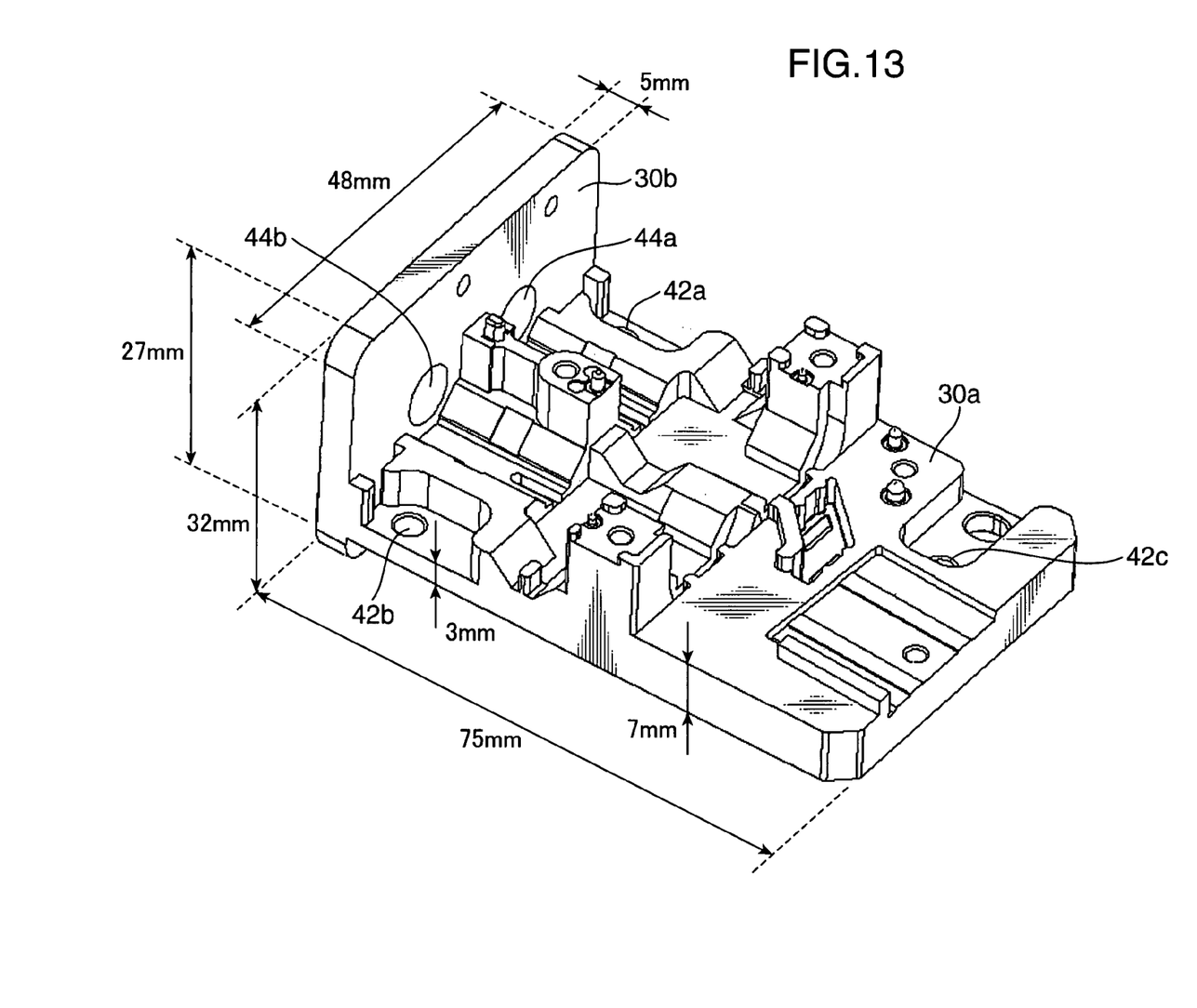
FIG. 13 is a perspective view showing the base member used in the multi-beam light source device according to the second embodiment.
Figure 14:
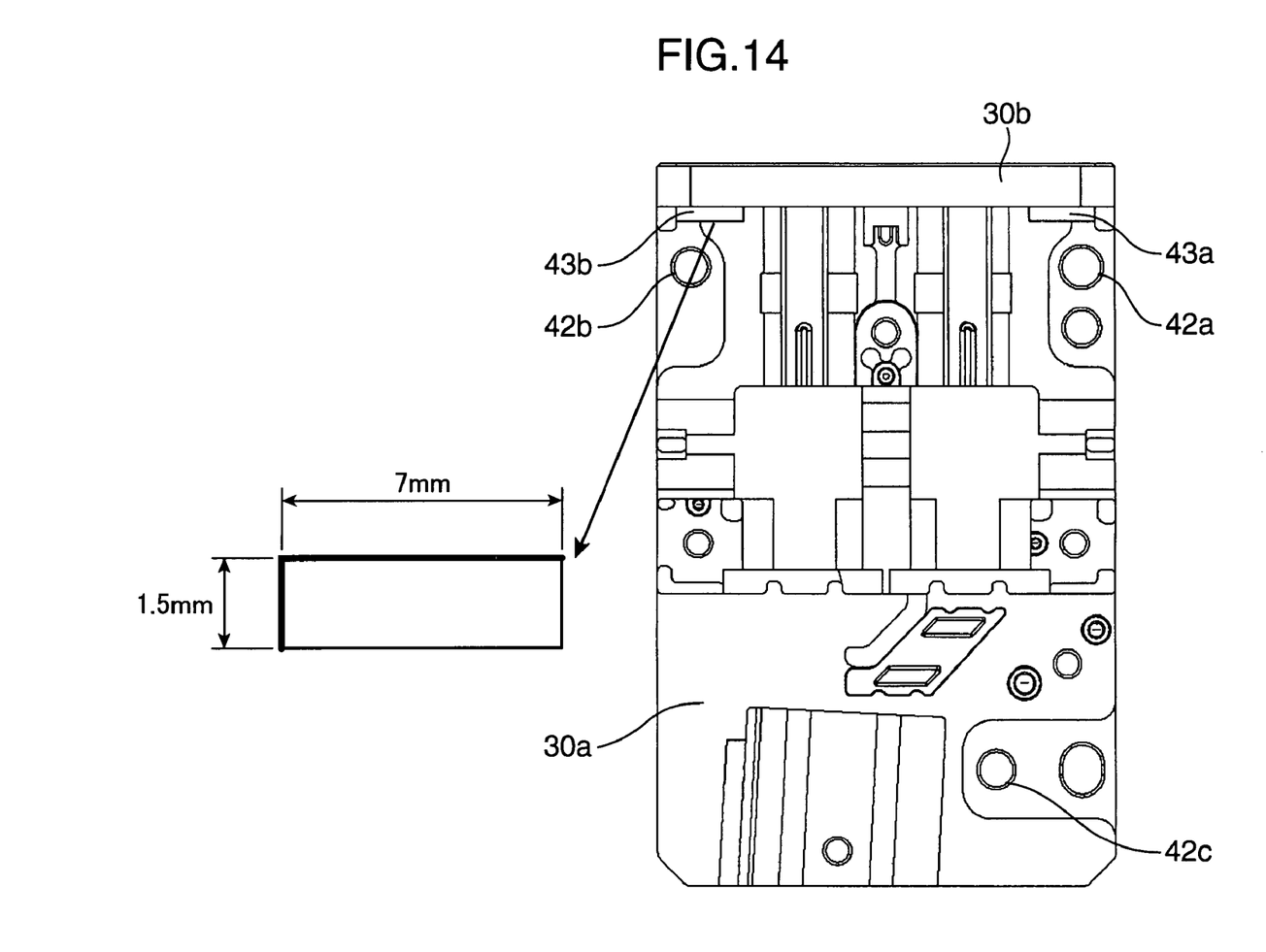
FIG. 14 is a plan view showing the base member used in the multi-beam light source device according to the second embodiment.

Using a base member made of aluminum as shown in FIG. 13 in which a standing portion 30b having a height of 32 mm, a width of 48 mm and a thickness of 5 mm was integrally formed at one end of a flat portion 30 a having a length of 75 mm, a width of 48 mm, a thickness of 7 mm at a flat part and a thickness of 3 mm around screw holes 42a, 42b such that the height of the standing portion 30b from the bottom surface of the flat portion 30a was 27 mm, an effect of suppressing the inclination of the standing portion 30b according to the present invention was studied. An angle of inclination of the standing portion 30b was calculated using a base member (present invention) of the first embodiment formed with through holes 43a, 43b having openings of 7 mm×1.5 mm as shown in FIG. 14 and an identically formed base member (comparative example) except that no through holes 43a, 43b were formed.

Conditions under which the angle of inclination was calculated were such that, after the base member 30 fixed to an installation by fastening screws through screw holes 42a to 42c formed in the flat portion 30a, the angle of inclination was calculated when temperature rose from 10° C. (low-temperature condition in the specification of the apparatus) to 50° C., using the aforementioned trigonometric function, in consideration of the thermal expansion coefficient of the material (aluminum) of the base member 30. The calculation result of the angle of inclination around the mount hole 44a is shown in TABLE-1 below.

TABLE 1

|  | Comparative Example | invention |
|---|---|---|
| Angle of inclination (degree) | 0.01175 | 0.00932 |

As is clear from TABLE-1, the angle of inclination in the base member 30 as a comparative example in which no through holes 43a, 43b were formed was 0.01175 degree, whereas the one in the inventive base member 30 in which the through holes 43a, 43b were formed was 0.00932 degree. The angle of inclination was smaller by about 20%. This result confirmed that the thermal expansion of the flat portion 30a could be taken up to effectively suppress the inclination of the standing portion 30b by using the inventive base member.

Although not described here, a similar result was obtained for the angle of inclination of a part around the mount hole 44b in which the LD 31b is to be disposed. It was confirmed to suppress the inclination of the flat portion 30a also in the light source device of the second embodiment in which the standing portion 30b is fixed by means of screws.

The light source device 102 according to the embodiments of the present invention described above is provided with the LDs 31a, 31b and the base member 30 obtained by integrally forming the flat portion 30a and the standing portion 30b projecting from one end of the flat portion 30a in a perpendicular direction, light beams emitted from the LDs 31a, 31b mounted in the standing portion 30b scanning a surface, wherein the flat portion 30a is formed with a plurality of screw holes 42a to 42c used to fix the base member 30 to the installation surface by means of screws, and the through holes 43a, 43b penetrating the flat portion 30a are formed between the standing portion 30b and the screw holes 42a, 42b formed near the standing portion 30b.

Thus, the angle of inclination of the standing portion 30b caused by the thermal deformation can be reduced, therefore being able to provide a light source device for preventing relative displacements of the LDs 31a, 31b and the optical members and an array displacement of the respective beam spots in the sub-scanning direction without using means for restricting the angle of the inclination in the sub-scanning direction and the like. The light source device can be produced at a lower cost since the angle of inclination of the standing portion 30b can be reduced by a simple construction. Further, since the through holes 43a, 43b are formed along the standing portion 30b, a strain caused by the thermal expansion of the flat portion 30 a becomes more unlikely to be transmitted, whereby the relative displacements of the LDs 31a, 31b and the optical members and the array displacement of the beam spots can be more effectively suppressed.

In the case of fixing the standing portion 30b of the base member 30 to the installation surface by means of screws, the through holes 43a, 43b penetrating the standing portion 30b are formed between the flat portion 30a and the screw fixing positions near the flat portion 30a. Thus, quite the same effect as in the case of fixing the flat portion 30 a by means of screws can be obtained. Further, by forming the through holes 43a, 43b along the flat portion 30a, a strain caused by the thermal expansion of the standing portion 30b becomes more unlikely to be transmitted to the flat portion 30a, whereby the relative displacements of the LDs 31a, 31b and the optical members and the array displacement of the beam spots can be more effectively suppressed.

Further, since the optical members are mounted on the flat portion 30a, the positional relationship between the LDs 31a, 31b and the optical members can be easily adjusted.

Further, according to the optical scanning apparatus 100 installed with the inventive light source device 102, there is no likelihood of changing the installation angle of the base member 30 due to the thermal deformation. Thus, all the components of the light source device 102 can be incorporated into the housing of the optical scanning apparatus 100 to secure sealability, and the relative displacements of the laser diodes and the optical members and the array displacement of the beam spots in the sub-scanning direction can be suppressed to improve writing precision.

The aforementioned specific embodiments mainly embrace features of the inventions having the following constructions.

A light source device according to the present invention comprises a laser diode for emitting a light beam, and a base member obtained by integrally forming a flat portion and a standing portion projecting in a direction perpendicular to the flat portion and to have the laser diode mounted therein, wherein the flat portion is formed with one or more screw holes for fixing the base member to a specified installation surface by means of screw(s), and through hole(s) penetrating the flat portion between the standing portion and the screw hole(s) formed near the standing portion.

With this first construction, a part of the flat portion between the standing portion and screw fixing position(s) near the standing portion is divided by the through hole(s) in the light source device in which the flat portion is fixed to the installation surface, even if the flat portion expands due to heat, the influence on an angle of inclination of the standing portion can be alleviated. Accordingly, relative displacements of the laser diode mounted in the standing portion and optical members for coupling the light beams emitted from the laser diode can be suppressed. Particularly, in a multi-beam light source device having a plurality of laser diodes, an array displacement of the respective beam spots in a sub-scanning direction can be effectively suppressed.

Another light source device according to the present invention comprises a laser diode for emitting a light beam, and a base member obtained by integrally forming a flat portion and a standing portion projecting in a direction perpendicular to the flat portion and to have the laser diode mounted therein, wherein the standing portion is formed with one or more screw holes for fixing the base member to a specified installation surface by means of screw(s), and through hole(s) penetrating the standing portion between the flat portion and the screw hole(s) formed near the flat portion.

With this second construction, a part of the standing portion between the flat portion and screw fixing position(s) near the flat portion is divided by the through hole(s) in the light source device in which the standing portion is fixed to the installation surface, even if the standing portion expands due to heat, the influence on an angle of inclination of the flat portion can be alleviated. Accordingly, similar to the first construction, relative displacements of the laser diode and optical members and an array displacement of the respective beam spots in a sub-scanning direction in a multi-beam light source device can be suppressed.

In the light source devices having the first and second constructions, the standing portion preferably projects in a perpendicular direction from one end of the flat portion. With such a construction, various optical components can be more easily arranged on the flat portion since the standing portion to have the laser diode mounted therein is arranged at one end of the flat portion.

In the light source devices having the first and second constructions, the through hole(s) is/are preferably formed along the standing portion or the flat portion.

With this construction, the influence of the terminal expansion of the flat portion or the standing portion can be more reduced by forming the through hole along the standing portion or the flat portion, wherefore the relative displacements of the laser diode and the optical members and the array displacement of the respective beam spots in the sub-scanning direction can be more effectively suppressed.

In this case, the through hole is preferably formed under the following conditions. The through holes are so formed in flat portion or the standing portion as to partly abut on a line where the standing portion stands up from the flat portion, and are so dimensioned as to suppress the transmission of a strain caused by the thermal expansion of the flat portion or the standing portion to the standing portion or the flat portion, the number of the through holes corresponding to the number of the screw holes formed near the standing portion or the flat portion. With this construction, the influence of the thermal expansion can be securely suppressed.

In the above light source devices, an optical member for coupling the light beams emitted from the laser diode is preferably mounted on the flat portion. This enables the positional relationship of the laser diode and the optical members to be easily adjusted.

An optical scanning apparatus according another aspect of the present invention comprises a light source device for generating a light beam, and a scanning optical member for focusing the light beam on a specified surface to be scanned and causing the light beam to scan, the light source device having the above first or second construction. According to these optical scanning apparatuses, precision in writing an image on the surface to be scanned can be improved by suppressing relative displacements of the laser diode and optical members and an array displacement of the respective beams in a sub-scanning direction.

This application is based on patent application No. 2005-237272 filed in Japan, the contents of which are hereby incorporated by references.

As this invention may be embodied in several forms without departing from the spirit of essential characteristics thereof, the present embodiment is therefore illustrative and not restrictive, since the scope of the invention is defined by the appended claims rather than by the description preceding them, and all changes that fall within metes and bounds of the claims, or equivalence of such metes and bounds are therefore intended to embraced by the claims.

What is claimed is:

1. A light source device, comprising:
a laser diode for emitting a light beam, and
a base member including a flat portion and a standing portion integral with the flat portion and projecting in a direction perpendicular to the flat portion, the standing portion having the laser diode mounted therein,
wherein the flat portion is formed with at least one screw hole for fixing the base member to a specified installation surface by means of at least one screw, and at least one through hole penetrating the flat portion between the standing portion and the screw hole, the through hole being formed in a part of the flat portion near the standing portion.

2. A light source device according to claim 1, wherein the standing portion projects in a perpendicular direction from one end of the flat portion.

3. A light source device according to claim 1, wherein the through hole is formed at a position on the flat portion substantially adjacent the standing portion.

4. A light source device according to claim 3, wherein the through hole is dimensioned to suppress transmission of strain caused by thermal expansion of the flat portion to the standing portion.

5. A light source device according to claim 1, wherein an optical member for coupling the light beams emitted from the laser diode is mounted on the flat portion.

6. A light source device according to claim 1, wherein the at least one screw hole comprises a plurality of screw holes, and wherein the at least one through hole comprises a plurality of through holes, the through holes being disposed respectively between the screw holes and the standing portion.

7. A light source device according to claim 1, further comprising a scanning optical member for focusing the light beam emitted by the laser diode onto a specified surface to be scanned and causing the light beam to scan.

8. A light source device according to claim 1, wherein the screw hole is substantially circular and the through hole is substantially rectangular.

9. A light source device according to claim 8, wherein the through hole has a dimension measured parallel to the standing portion that exceeds a diameter of the screw hole.

10. A light source device, comprising:

a laser diode for emitting a light beam, and a base member including a flat portion and a standing portion integral with the flat portion and projecting in a direction perpendicular to the flat portion, the standing portion having the laser diode mounted therein, wherein the standing portion is formed with at least one screw hole for fixing the base member to a specified installation surface by means of at least one screw, and at least one through hole penetrating the standing portion between the flat portion and the screw hole the through hole being formed in a part of the standing portion near the flat portion.

11. A light source device according to claim 10, wherein the standing portion projects in a perpendicular direction from one end of the flat portion.

12. A light source device according to claim 10, wherein an optical member for coupling the light beams emitted from the laser diode is mounted on the flat portion.

13. A light source device according to claim 10, further comprising a scanning optical member for focusing the light beam emitted by the laser diode onto a specified surface to be scanned and causing the light beam to scan.

14. A light source device according to claim 10, wherein the at least one through hole is formed at a position on the standing portion substantially adjacent the flat portion.

15. A light source device according to claim 14, wherein the through hole is dimensioned to suppress transmission of a strain caused by thermal expansion of the standing portion to the standing portion.

16. A light source device according to claim 10, wherein the at least one screw hole comprises a plurality of screw holes, and wherein the at least one through hole comprises a plurality of through holes, the through holes being disposed respectively between the screw holes and the flat portion.

17. A light source device according to claim 10, wherein the screw hole is substantially circular and the through hole is substantially rectangular.

18. A light source device according to claim 17, wherein the through hole has a dimension measured parallel to the flat portion that exceeds a diameter of the screw hole.

* * * * *